US006185303B1

(12) United States Patent
Losey

(10) Patent No.: US 6,185,303 B1
(45) Date of Patent: Feb. 6, 2001

(54) ENCLOSURE MOUNTING BRACKET

(76) Inventor: Francis R. Losey, 23312C SW. 58th Ave., Boca Raton, FL (US) 33428

( * ) Notice: Under 35 U.S.C. 154(b), the term of this patent shall be extended for 0 days.

(21) Appl. No.: 08/996,780

(22) Filed: Dec. 23, 1997

(51) Int. Cl.$^{7}$ .............................. H04M 1/00; A47B 96/06
(52) U.S. Cl. ......................... 379/454; 379/453; 248/219.4
(58) Field of Search ..................................... 379/454, 447, 379/453; 248/218.4, 219.4, 219.1, 230.8

(56) References Cited

U.S. PATENT DOCUMENTS 4,659,046 * 4/1987 Parduhn ............................ 248/219.4

* cited by examiner

*Primary Examiner*—Jack Chiang
(74) *Attorney, Agent, or Firm*—Cumpston & Shaw

(57) ABSTRACT

An enclosure mounting bracket kit for attaching an enclosure with an exterior flange to a post is described. The mounting bracket includes an elongated horizontal rigid bar having first and second elongated studs protruding from the front side surface for penetrating the mounting holes of the flange; at least one through-hole in each of the first and second studs transverse to a long axis of the stud so that when each of the first and second studs penetrates a mounting hole the through-hole penetrates the flange; first and second releasable pins for positioning in each through-hole and gripping each of the first and second studs respectively; a block attached to the rear side surface of the bar between the first and second studs, the block having a surface generally conforming to the outside surface of the post; an adjustable strap attached to the rear surface for encompassing the post; and a ratchet tensioning device pivotally attached to the rear surface for tightening the strap around the post.

14 Claims, 4 Drawing Sheets

FIG. 1
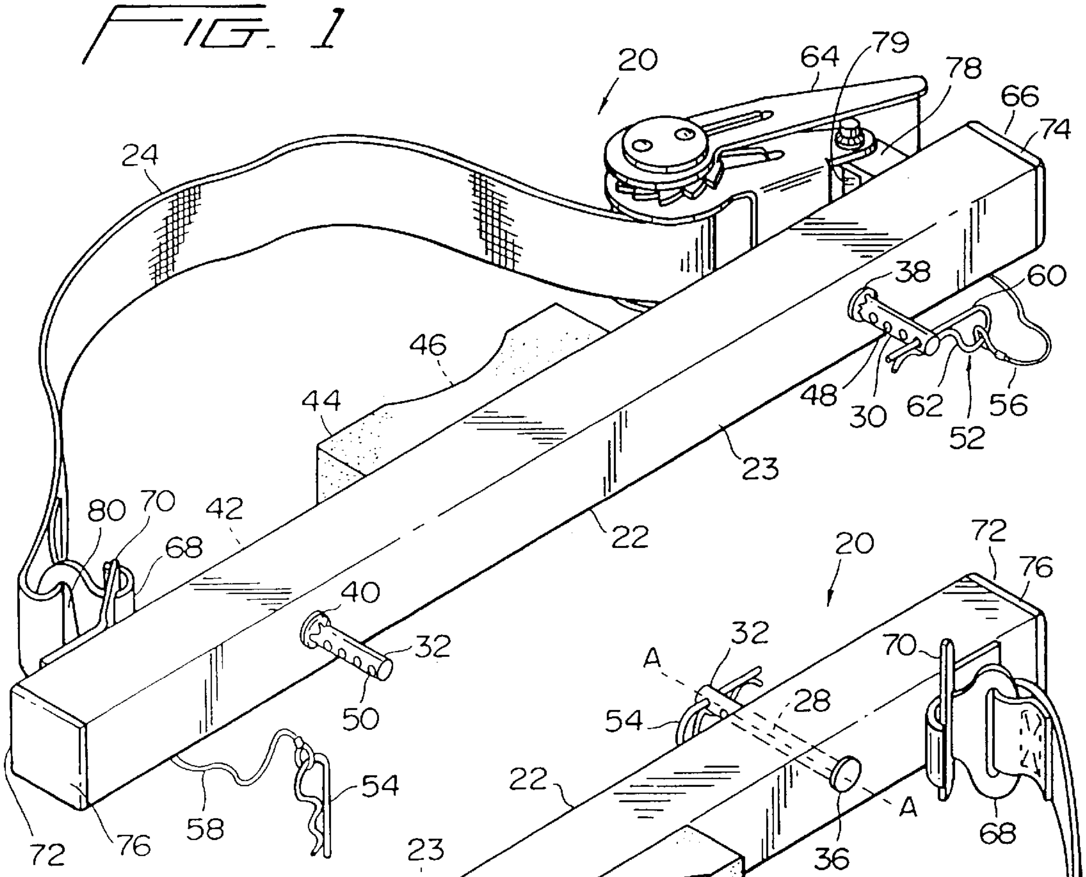
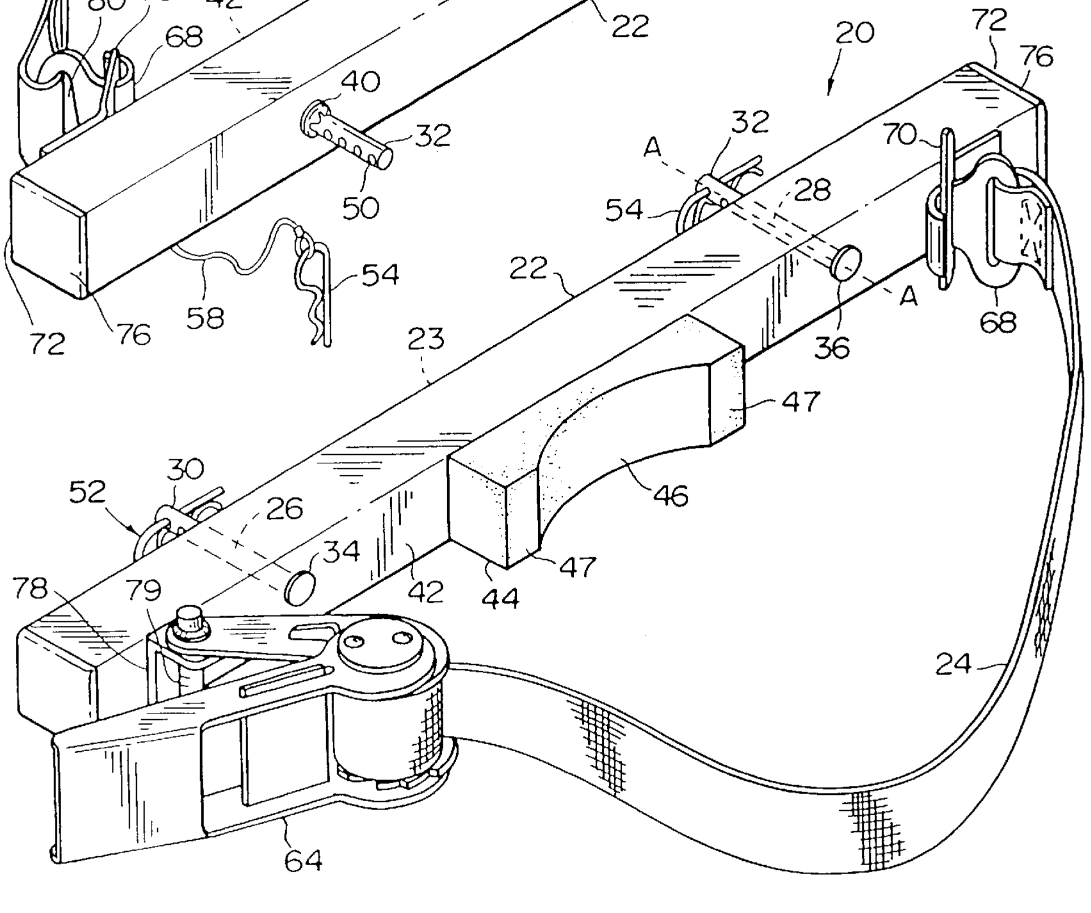
FIG. 2

ENCLOSURE MOUNTING BRACKET

FIELD OF THE INVENTION

This invention relates generally to a bracket for mounting an enclosure to a supporting structure, and in particular to a mounting bracket kit for removably mounting an enclosure to a post.

BACKGROUND OF THE INVENTION

It is commonly necessary for linemen repairing or installing electrical power lines, telephone lines, and associated equipment to use instruments or tools which are conveniently housed in an enclosure which can be mounted to the utility pole at the work site. Preferably such an enclosure should be a weather tight box capable of being quickly and securely attached to, and removed from, a pole, such as a wooden or concrete utility pole, or a metal lamp pole, under adverse weather conditions. Frequently the enclosure, such as a tool box or an instrument box, is rather heavy and the bracket for mounting the enclosure to a pole must be strong and dependable. Such mounting brackets may need to be used repeatedly with one or more types of enclosures.

Previously such attachments were made with rope or wire or other improvised solutions dictated by the particular installation and frequently such devices were not entirely satisfactory. Such ad hoc solutions can be time consuming and unsafe. Such devices for mounting the enclosure are not always dependable or reusable and could possibly defeat the weather tightness of the enclosure.

U.S. Pat. No. 4,827,504 shows a mounting plate with straps passing through the plate for attaching a utility box to a pole. The utility box is connected to the plate with bolts passing through mounting ears on the box that engage threaded openings in the plate. Mounting and removing the box requires a lineman to use a tool for screwing and unscrewing the mounting bolts. In some locations, especially under adverse weather conditions, installing the bolts and manipulating the tool could be difficult and hazardous.

Although, various other devices for mounting objects, such as sporting equipment, lamps, shelves, ladders and the like to a support are known, there remains a need for a dependable, reusable enclosure mounting bracket, which is especially suitable for quick installation and removal, and secure mounting of an enclosure to a supporting base, which does not require the use of tools and which does not threaten the integrity of the enclosure.

SUMMARY OF THE INVENTION

Briefly stated the invention is for an enclosure mounting bracket kit containing at least one mounting bracket with an adjustable strap for attaching an enclosure to a post, such as a utility pole or a beam. The enclosure, such as an instrument box or tool box, includes a flange external to the enclosure which is provided with mounting holes for attaching to one or more mounting brackets.

The mounting bracket of the invention includes an elongated horizontal rigid bar having front and rear side surfaces and first and second ends; first and second elongated studs protruding from the front side surface adjacent the first and second ends respectively for penetrating the mounting holes of the flange; at least one through-hole in each of the first and second studs transverse to a long axis of the stud so that when each of the first and second studs penetrates a mounting hole the through-hole penetrates the flange; first and second releasable pins for positioning in each through-hole and gripping each of the first and second studs respectively; a block attached to the rear side surface of the bar between the first and second studs, the block having a surface generally conforming to the outside surface of a post; and an adjustable strap attached to the rear surface for encompassing the post.

In a preferred embodiment of the invention, the mounting bracket has a ratchet tensioning device attached to the rear surface adjacent the first end for retaining one end of the strap and tightening the strap around the post; a holder attached to an opposite end of the strap; and a hold-down attached to the rear side surface adjacent the second end for restraining the holder when the strap is tightened.

In another embodiment of the invention, the enclosure mounting kit further includes a second mounting bracket which includes an elongated horizontal rigid bar having front and rear side surfaces and first and second ends; first and second elongated studs protruding from the front side surface adjacent the first and second ends respectively for penetrating the mounting holes of the flange; at least one through-hole in each of the first and second studs transverse to a long axis of the stud so that when each of the first and second studs penetrates a mounting hole the through-hole penetrates the flange; first and second releasable pins for positioning in each through-hole and gripping each of the first and second studs respectively; and a block attached the rear side surface of the rigid bar between the first and second studs, the block having a surface generally conforming to the outside surface of the post.

The enclosure is preferably attached to the post; (a) either with one mounting bracket with the strap and ratchet and one mounting bracket without the strap and ratchet or (b) with two mounting brackets, each having a strap and a ratchet.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

BRIEF DESCRIPTION OF THE DRAWINGS

FIG. 1 is a perspective front side view of a mounting bracket with attached strap.

FIG. 2 is a perspective rear side view of a mounting bracket with attached strap.

DETAILED DESCRIPTION OF THE INVENTION

Figure 3:
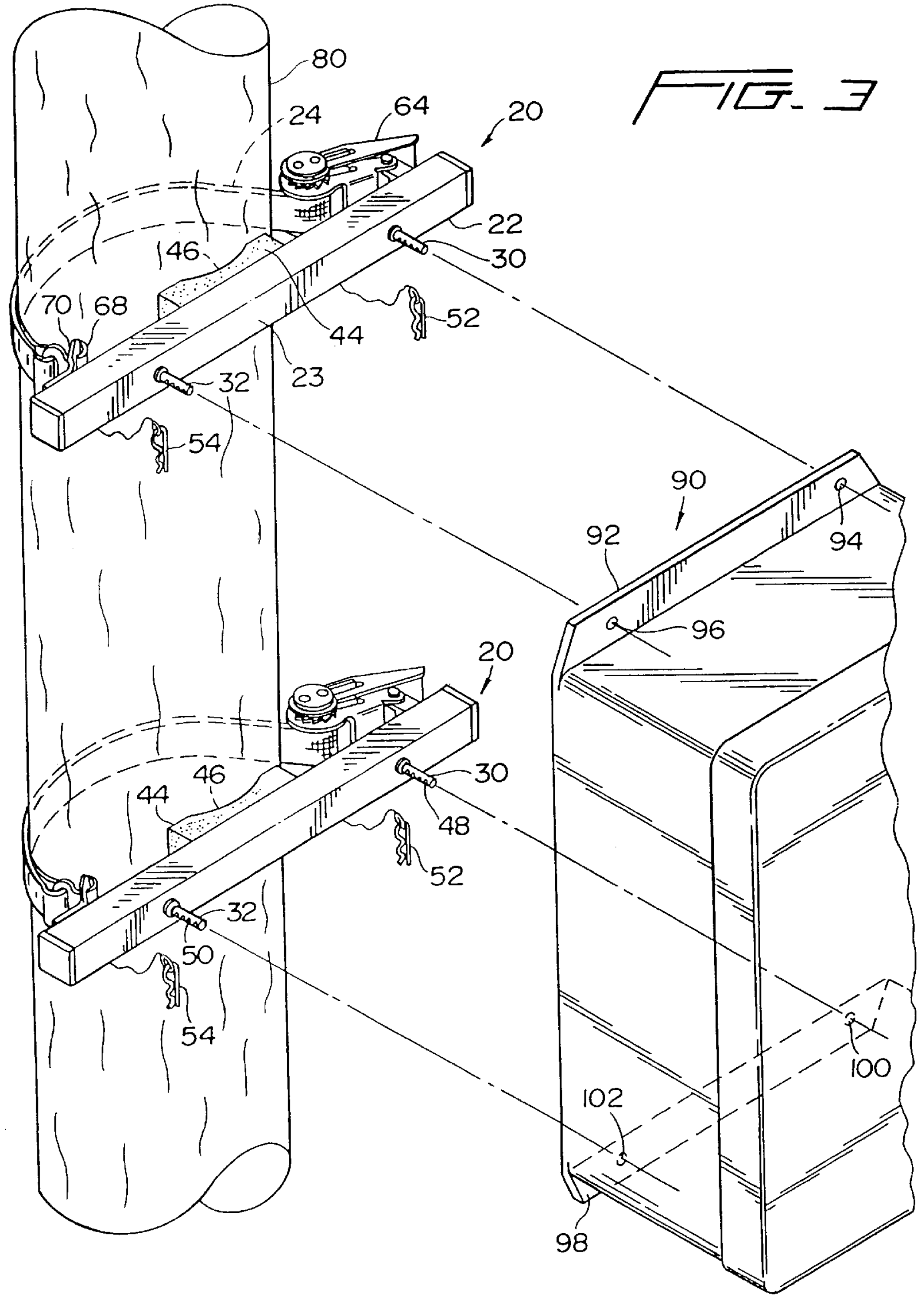
FIG. 3 is a perspective front side view of a mounting bracket with strap attached to a utility pole before attachment of an enclosure.

The enclosure mounting bracket kit of the invention preferably includes at least one enclosure mounting bracket with an adjustable strap for attaching an enclosure to a post. By post there is meant a supporting structure such as a utility pole, a light pole or a beam made of either wood, metal or concrete, and the like. Such posts can have curved or flat outside surfaces, for example, round- or rectangular-shaped posts. More commonly, for secure attachment, the enclosure is supported by either two mounting brackets with an adjustable strap or one mounting bracket with an adjustable strap and one mounting bracket without an adjustable strap. Each type of enclosure mounting bracket is described in detail below.

Referring to FIGS. 1 and 2, there is shown a mounting bracket assembly 20 which includes a rigid bar 22 and an adjustable strap 24. The rigid bar 22 can be of any suitable shape but is preferably an elongated rectangular-shaped, tubular bar. Two elongated mounting studs 30, 32 extend through apertures 26, 28, respectively, adjacent opposite ends of the bar 22 and protrude from the front side 23 of bar 22. Each of the studs 30, 32 has an enlarged terminal head 34, 36 respectively, which is clamped against the bar 22 by retainers, such as compression rings 38, 40, that engage the studs on the opposite side of bar 22.

A generally rectangular, resilient block 44, which has a curved surface 46 shaped to conform to the curved surface of a utility pole, is permanently attached to the rear side 42 of bar 22. The block 44 also has flat surfaces 47 on either side of the curved surface 46 and parallel to the bar 22 which conform to the flat surface of a beam. Thus the bracket 20 can be readily mounted to either curved or flat surfaces.

Other types of studs can be mounted to the bar. For example, studs could be welded to the front surface or threaded studs could be screwed into threaded holes in the front surface of the bar. The studs 30, 32 are preferably round and have a series of through-holes 48, 50 respectively, drilled through the protruding portion of each stud transverse to a long axis A-A of each stud for receiving releasable pins.

Releasable pins, such as hitch pins 52, 54, are preferably attached adjacent to opposite ends of the bar 22 by flexible fasteners 56, 58 respectively. Such fasteners 56, 58 include lanyards and chains. Each releasable pin 52, 54 is designed to be readily inserted in or removed from a corresponding through-hole of each stud by hand. In a preferred version of a releasable pin, for example pin 52, the pin 52 is a generally U-shaped metal pin with a straight leg 60 for positioning in a through-hole 48 and a curvilinear leg 62 for clamping to the outside of the stud 30. Other types of retaining pins, such as cotter pins could also be used.

A ratchet device 64 is pivotally attached to the rear side 42 of bar 22 adjacent to one end 66 of bar 22 by means of a U-shaped bracket 78 and pin 79 which provides pivoting capability to conform the ratchet device 64 to different size posts. The bracket 78 is screwed or riveted to the rigid bar 22. One end of strap 24, which is preferably a flexible webbing or similar strong material, is wound onto the ratchet 64 and the other end of strap 24 is provided with a holder, such as hook 68. A holddown bracket 70 with a slot 82 for engaging hook 68 is attached by screws or rivets to the rear side 42 of the bar 22 adjacent the opposite end 72 of bar 22. In use, the strap encircles the utility pole and the hook 68 is attached to the hold-down 70. Manipulation of the ratchet lever winds up the strap and tightens the rigid bar 22 against the pole. Suitable ratchet devices can be obtained from Durex Co., Division of Allied International Inc., Sylmar, California.

The ends 66, 72 of the tubular rigid bar 22 are capped with plastic plugs 74, 76 respectively.

Figure 4:
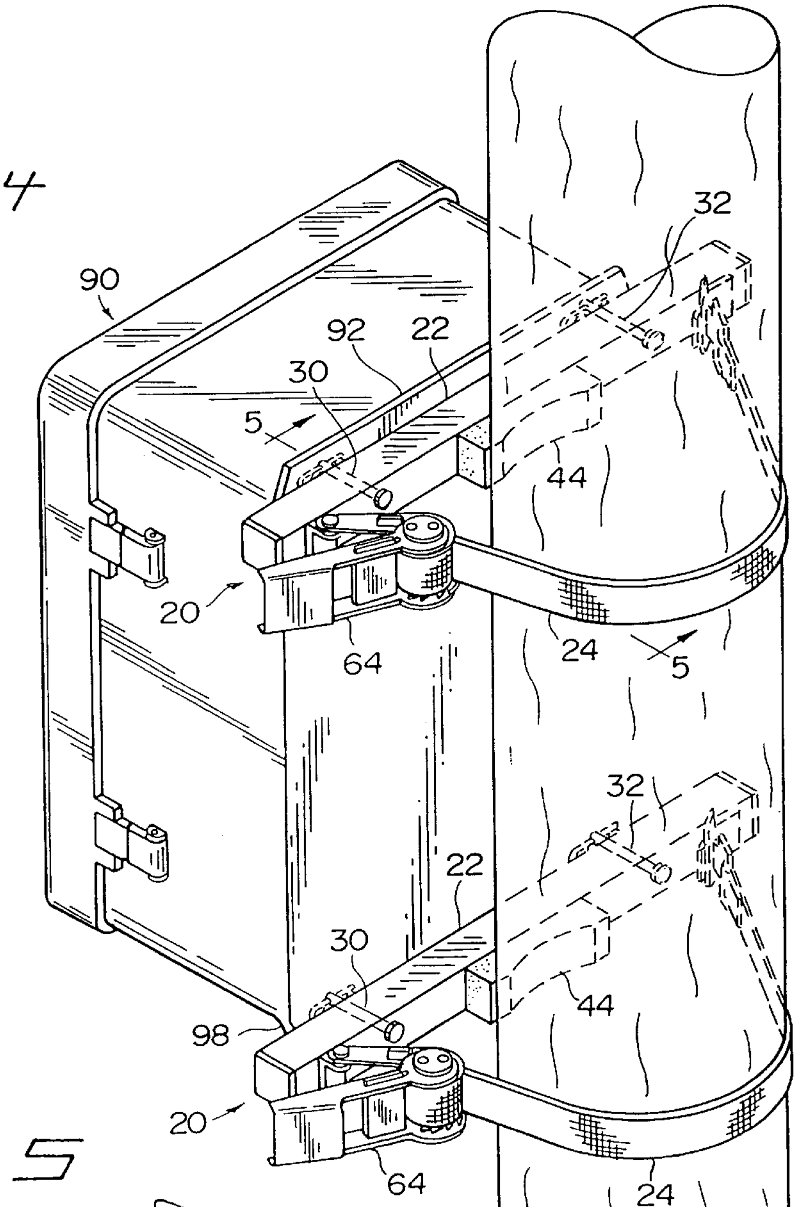
FIG. 4 is a perspective rear side view of two mounting brackets with straps and an enclosure attached to a utility pole.

Referring to FIGS. 3 and 4, two mounting bracket assemblies 20 are shown attached to a utility pole 80. The assembly is attached by pressing the curved surface 46 of block 44 against the rounded surface of the utility pole, wrapping the strap 24 around the pole 80, attaching the hook 68 to hold-down 70, then tensioning the strap 24 with the ratchet device 64 so that the bar 22 and block 44 are held firmly against the pole 80 and the bar 22 is aligned horizontally. Once a mounting bracket assembly 20 is attached to the utility pole 80 an enclosure 90, with a top exterior flange 92 having mounting holes 94, 96 alignable with studs 30, 32 respectively, can be readily mounted to the studs. Mounting is achieved by sliding the mounting holes 94, 96 over the studs 30, 32 respectively until the flange 92 of the enclosure 90 abuts the front side 23 of the bar 22 and then inserting by hand the releasable pins 52, 54 into a through-hole 48, 50 respectively, which last penetrated the top flange 92. The enclosure 90 can also be provided with a bottom flange 98 having mounting holes 100, 102 for aligning with the studs 30, 32 respectively of a second bracket assembly 20. The second bracket assembly 20 is attached to the utility pole 80 and to the enclosure 90 in the same manner as for the bracket assembly described above. Depending on the type of enclosure a lineman can choose whether one or two bracket assemblies are required for safely mounting the enclosure.

Referring to FIG. 4, there is shown a rear side view of an enclosure 90, such as an instrument box, mounted to a utility pole 80 with two bracket assemblies 20 having rigid bars 22 and adjustable straps 24. Each bracket assembly 20 mounts to a flange 92, 98 of enclosure 90 by means of studs 30, 32 as described before.

Figure 5:
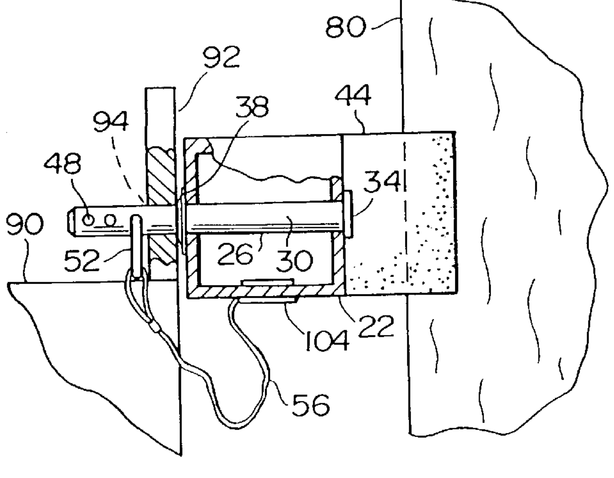
FIG. 5 is a cross sectional view of the mounting bracket of FIG. 4.

Referring to FIG. 5, there is shown a partial cross sectional view of the mounting bracket assembly of FIG. 4 taken along the line 5—5 after mounting the enclosure 90 to the pole 80. The block 44 is conformed to the surface of the pole 80. The stud 30 passes through the aperture 26 in rigid bar 22 and the mounting hole 94 in flange 92 . The releasable pin 52 is positioned in a through hole 48 nearest the flange 92 to obtain a tight fit The terminal head 34 of stud 30 is clamped to the bar 22 by compression ring 38. The releasable pin 52 is attached by flexible lanyard 56 to the underside of bar 22 by a rivet 104.

Figure 6:
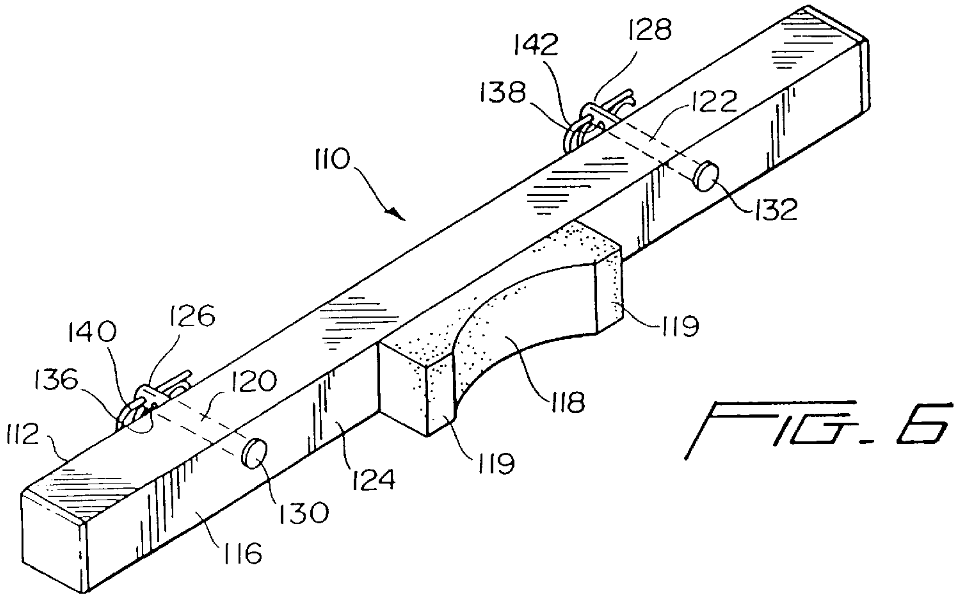
FIG. 6 is a perspective rear side view of a mounting bracket without strap.

Referring now to FIG. 6, there is shown an alternative mounting bracket 110 without a strap for attaching the bracket 110 to a utility pole. The mounting bracket 110 includes a rigid bar 112 and a resilient block 114 attached to a rear side 116 of the bar 112. The block 114 has a curved surface 118 shaped to conform to the surface of a utility pole. The block 114 also has flat surfaces 119 on either side of the curved surface 118 and parallel to the bar 112 which conform to the flat surface of a beam. Thus the bracket 110 can be readily mounted to either curved or flat surfaces. Extending through apertures 120, 122 in the bar 112 and protruding from the front side 124 of bar 112 are two elongated mounting studs 126, 128 respectively. Each aperture is adjacent an opposite end of the bar 112. Each of studs 126, 128 has a terminal head 130, 132 respectively, which is clamped against the bar 112 by compression rings (not shown) as described for mounting bracket assembly 20.

The studs 126, 128 are preferably round and have a series of through-holes 136, 138 respectively, drilled through the protruding portion of each stud transverse to a long axis of each stud. Provided with the mounting bracket 110 are releasable pins 140, 142 which are preferably attached to opposite ends of the bar 112 by flexible lanyards (not shown) as described for mounting bracket assembly 20. Each releasable pin 140, 142 is designed to be readily inserted in or removed from a corresponding through-hole of each stud by hand.

Figure 7:
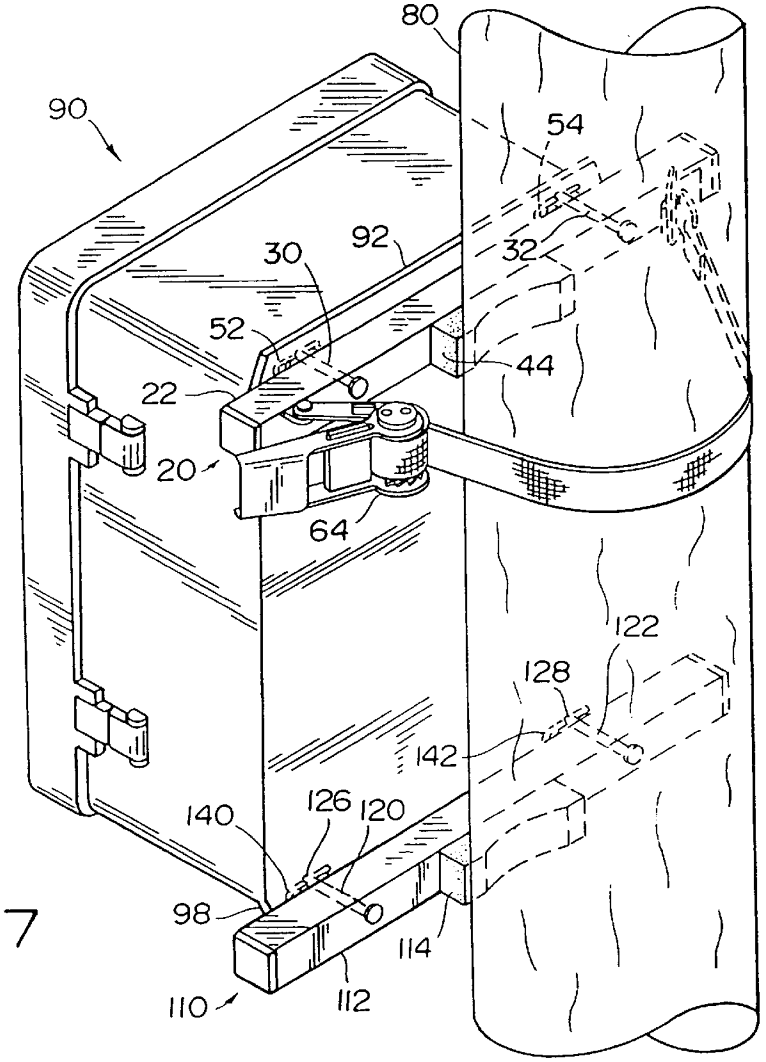
FIG. 7 is a perspective rear side view of an enclosure attached to a utility pole with one mounting bracket a with strap and one mounting bracket without a strap.

Referring to FIG. 7, there is shown an alternative method of mounting an enclosure 90 to a utility pole 80. A mounting bracket 110 is first attached to the bottom flange 98 of enclosure 90 by studs 126, 128 and releasable pins 140, 142 respectively. A mounting bracket assembly 20 is then attached to the utility pole 80 as described above and then the top flange 92 of enclosure 90 with the attached mounting bracket 110 is mounted to studs 30, 32 and retained with releasable pins 52, 54 respectively. The strap 24 is tensioned by ratchet 64 so that the horizontal rigid bar 22 and block 44 is held firmly against the utility pole 80, with horizontal rigid bar 112 and block 114 providing support stability.

Suitable materials for the metal components of the brackets 20, 110 include steel, aluminum and brass. Typically the rigid bar 22 is made of aluminum and the studs 30, 32 releasable pins 52, 54 and fasteners 56, 58 are made of steel. The hold-down 70 and ratchet bracket 78 are typically made of aluminum and the ratchet device 64 is manufactured from steel or brass. The hook 68 is manufactured from steel or aluminum and coated with rubber.

The mounting block is formed from a rubber or thermoplastic polymer and the releasable strap is made from a polymeric fiber, preferably nylon or other decay resistant material.

The dimensions of the rigid bar can vary according to the requirements of the installation. Typically the rigid bar is about 14 inches long, 1 inch wide and 1 inch high. The studs protrude about 1 inch from the bar and have from 1 to 4 through holes in the protruding portion of each stud. The studs are mounted symmetrically about the center of the bar and are spaced apart at about 6 inches or 8 inches. The resilient block on the 14" bar is about 3.5 inches long, 1" wide and 1" high and has a 1.5 long by 0.5" deep concave recess about the center of the block. The adjustable strap provided is generally about 3 feet long and can be readily adjusted to encompass different size posts. The length of the bar and the spacing between the studs can be readily modified to accommodate the requirements for specific enclosures and posts.

The enclosure mounting brackets are advantageous because the rigid bar with the forward facing protruding studs with the releasable pins and the rear facing resilient block can be quickly and securely used to attach an enclosure to a mounting surface of a post, such as a utility pole or a beam, without the use of additional tools. The enclosure mounting brackets provide a dependable, safe and secure installation which can be quickly removed when the work is done.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. An enclosure mounting bracket for attaching an enclosure with an exterior flange and at least two mounting holes extending through the flange to a post, the bracket comprising:

an elongated rigid bar having front and rear side surfaces and first and second ends;

first and second spaced apart elongated studs protruding from the front side surface for penetrating a mounting hole of the flange;

at least one through-hole in each of the first and second studs transverse to a long axis of the stud so that when each of the first and second studs penetrates a mounting hole the at least one through-hole penetrates the flange;

first and second releasable pins for positioning in the at least one through-hole of the first and second studs respectively and gripping each of the first and second studs respectively; and a block attached to the rear side surface of the bar between the first and second studs, the block having a surface generally conforming to the outside surface of the post.

2. The bracket of claim 1, further comprising:

an adjustable strap for encompassing the post;

a ratchet type tensioning device pivotally attached to the rear side surface adjacent the first end for retaining one end of the strap and tightening the strap around the post;

a holder attached to an opposite end of the strap; and a hold-down attached to the rear side surface adjacent the second end for restraining the holder when the strap is tightened.

3. The bracket of claim 1, further comprising first and second fasteners attached between each of the first and second releasable pins respectively and the rigid bar.

4. The bracket of claim 1, in which the rigid bar has first and second apertures extending there through from the front side surface to the rear side surface for receiving a portion of the first and second studs respectively there though, each stud portion having a terminal head for contacting the rear side surface surrounding each aperture.

5. The bracket of claim 4, further comprising first and second retainers grippingly attached to each of the first and second studs respectively and contacting the front side surface surrounding each of the first and second apertures respectively for clamping each terminal head against the rear side surface of the rigid bar.

6. The bracket of claim 1, in which the block has a curved surface generally conforming to the outside diameter of a utility pole.

7. A mounting bracket kit for attaching an enclosure with an exterior flange and a plurality of mounting holes extending through the flange to a vertically oriented post, the kit comprising:

an elongated horizontal first rigid bar having front and rear side surfaces and first and second ends;

first and second elongated studs protruding from the front side surface adjacent the first and second ends respectively for penetrating a mounting hole of the flange;

at least one first through-hole in each of the first and second studs transverse to a long axis of each of the first and second studs respectively so that when each of the first and second studs penetrates a mounting hole the at least one first through-hole penetrates the flange;

first and second releasable pins for positioning in the at least one through hole of the first and second studs respectively first through-hole and gripping each of the first and second studs respectively;

a first block attached to the rear side surface of the first rigid bar between the first and second studs, the first block having a surface generally conforming to the outside surface of the post;

an adjustable strap for encompassing the post;

a ratchet type tensioning device pivotally attached to the rear surface adjacent the first end for retaining one end of the strap and tightening the strap around the post;

a holder attached to an opposite end of the strap; and a hold-down attached to the rear side surface adjacent the second end for restraining the holder when the strap is tightened.

8. The kit of claim 7, in which the first rigid bar has first and second apertures extending there through from the front side surface to the rear side surface for receiving a portion of the first and second studs respectively there though, each stud portion having a terminal head for contacting the rear side surface surrounding each aperture.

9. The kit of claim 7, further comprising first and second fasteners for attaching the first and second releasable pins respectively to the first rigid bar.

10. The kit of claim 7, in which the first block has a curved surface generally conforming to the outside diameter of a utility pole.

11. The kit of claim 7, further comprising:

an elongated horizontal second rigid bar having front and rear side surfaces and third and fourth ends;

third and fourth elongated studs protruding from the front side surface of the second rigid bar adjacent the third and fourth ends respectively for penetrating the mounting holes of the flange;

at least one second through-hole in each of the third and fourth studs transverse to a long axis of the third and fourth studs respectively so that when each of the third and fourth studs penetrates a mounting hole the at least one second through hole penetrates the flange;

third and fourth releasable pins for positioning in the at least one second through-hole of the third and fourth studs respectively and gripping each of the third and fourth studs respectively.

a second block attached to the rear side surface of the second rigid bar between the third and fourth studs, the second block having a surface generally conforming to the outside surface of the post.

12. The kit of claim 11, further comprising third and fourth fasteners for attaching the third and fourth releasable pins respectively to the second rigid bar.

13. The kit of claim 11, in which the second rigid bar has third and fourth apertures extending there through from the front side surface of the second rigid bar to the rear side surface of the second rigid bar for receiving a portion of the third and fourth studs respectively there though, each stud portion of the third and fourth studs having a terminal head for contacting the rear side surface of the second bar surrounding each of the third and fourth apertures respectively.

14. The kit of claim 11, in which the second block has a curved surface generally conforming to the outside diameter of a utility pole.

* * * * *